United States Patent [19]

Blessing et al.

[11] 4,420,273

[45] Dec. 13, 1983

[54] COUPLING DEVICE FOR THE PLAY-FREE CONNECTION OF A PRECISION POTENTIOMETER WITH A MOVABLE MACHINE PART

[75] Inventors: Fritz Blessing, Ostfildern; Gabor Margitics, Esslingen; Gerhard Brauer, Geltendorf, all of Fed. Rep. of Germany

[73] Assignee: Firma Novotechnik KG Offterdinger GmbH & Co., Ostfildern, Fed. Rep. of Germany

[21] Appl. No.: 318,111

[22] Filed: Nov. 4, 1981

[30] Foreign Application Priority Data

Nov. 5, 1980 [DE] Fed. Rep. of Germany ....... 3041639
Oct. 21, 1981 [DE] Fed. Rep. of Germany ....... 3141655

[51] Int. Cl.³ .......................... F16D 1/00; F16D 3/00
[52] U.S. Cl. ...................................... 403/24; 338/176
[58] Field of Search .................. 403/24, 410; 338/43, 338/47, 128, 176, 198; 324/207, 208

[56] References Cited

U.S. PATENT DOCUMENTS

| | | | |
|---|---|---|---|
| 3,697,867 | 10/1972 | Kleesattel | 324/207 |
| 3,737,830 | 6/1973 | Lark et al. | 338/198 X |
| 4,121,155 | 10/1978 | Chamuel | 324/207 |
| 4,172,248 | 10/1979 | Okuya | 338/176 |

*Primary Examiner*—Wayne L. Shedd
*Attorney, Agent, or Firm*—McAulay, Fields, Fisher, Goldstein & Nissen

[57] ABSTRACT

A coupling device is provided for coupling the movable member of a machine to a potentiometer to convert sliding movement of the member into proportionate movement of potentiometer. The device includes a first rod which is attachable to the movable machine member and a second rod which is connectable to the potentiometer. A ball-shaped slide is attached to the first rod and a planar abutment is attached to the second rod. The glide piece and the abutment are in abuting contuct with one another. A biasing spring is provided which applies pressure, in a working direction, to the glide piece to thereby maintain the glide piece and the planar abutment in intimate engagement with one another. This arrangement forms a joint connection between the first and second rods which enables transmission there between of only translational movement.

9 Claims, 3 Drawing Figures

COUPLING DEVICE FOR THE PLAY-FREE CONNECTION OF A PRECISION POTENTIOMETER WITH A MOVABLE MACHINE PART

BACKGROUND OF THE INVENTION

The present invention relates to a coupling device and more particularly to a coupling device which permits play-free connection of a precision potentiometer and a movable machine part.

It is known in the art that a determination of the movement of machines, for example the relative displacement movement of a machine setting member, is needed to control shifting movement of the machine. When translatory shifting movement is to be determined by a path measuring device, constructed as a potentiometer, the machine and the potentiometer must be precisely connected to one another and bought into an almost parallel relationship so that the shifting movement of the machine elements can be translated to the slider of the potentiometer. Due to both required tolerances and the very exact guidance which the path measuring device requires, so that measuring can be carried out properly, problems occur in converting the shifting movement into potentiometer displacement that have not been eliminated heretofore.

When the movable parts of the potentiometer and the machine are rigidly coupled, rapid destruction in the potentiometer region occurs, resulting in a continuously increasing measurment error. Loose coupling, however, results in inaccuracies in the conversion of the translatory shifting movement and, further, does not offer the necessary degree of freedom for proper operation and transmission of translatory movement Accordingly, one object of the present invention is to provide a coupling device which transmits, in a play-free manner, the translatory movement of a machine part to a precision potentiometer, and which concomitantly permits free motion in other directions, namely: parallel displacement in the X and the Y direction, whereby the Z direction is the direction of the to-be measured play-free movement.

Another object of the present invention is to provide such a device which is substantially easy and inexpensive to install, and which can be installed almost completely by unskilled labor without the occurrance of measuring errors or other problems.

BRIEF DESCRIPTION

The coupling device of the present invention connects a movable portion of potentiometer with a machine element capable of performing a translatory setting movement. The coupling device permits forces exclusively in the direction of sliding movement which guarantees a play-free transmission of forces. In all other conceivable directions of movement, the device is essentially both force-free and backlash-free so that the potentiometer is not influenced by any forces which do not contribute to the desired setting movement.

In one embodiment of the present invention a coupling device capable of providing a play-free connection, in a working direction, of a movable tap of a precision potentiometer and a movable setting member of a machine is provided. The device includes a ball-shaped glide piece which is secured to one of the movable parts and a planar abutment which is secured to the other movable part. A pre-tensioning spring is provided which is positioned such that it is capable of pressing the glide piece and the planar abutment against one another to thereby obtain the play-free connection.

The components of the coupling device are not subjected to bending due to their arrangement relative to one another. The coupling device is thus capable of withstanding: parallel displacement in the entire X-Y coordinate plane; circular movement; planar movement; tumbling movement; or a combination of all the foregoing movements.

In one embodiment of the present invention, the glide piece is sandwiched between planar abutments. The glide piece can be a hardened steel ball and the abutments can be flat ground sapphire stones. One of the stones can be pressed by the pre-tensioning spring so that the steel ball is held between the two sapphire stones without any play. This arrangement provides a joint-like connection between the steel ball and the oppositely located sapphire stones. The sapphire stones may be mounted in the sliding element of the potentiometer, and the setting member of the machine is connected to the steel ball using a pin. The steel ball, held in play-free position by the stones is suitable for the transmission of translatory movement, but is movable in all other directions. Thus, the steel ball can freely shift upwardly, downwardly, and rearwardly within a space defined by the two sapphire stones. The ball can perform both rotary movements about itself and tilting movements about the pin connected to it without causing a change in or influencing the translatory path to be measured. Thus actuation of a longitudinal potentiometer, acting as a path measuring device, is possible without any substantial force acting upon the mounting thereof.

DESCRIPTION OF THE PREFERRED EMBODIMENTS

Figure 1:
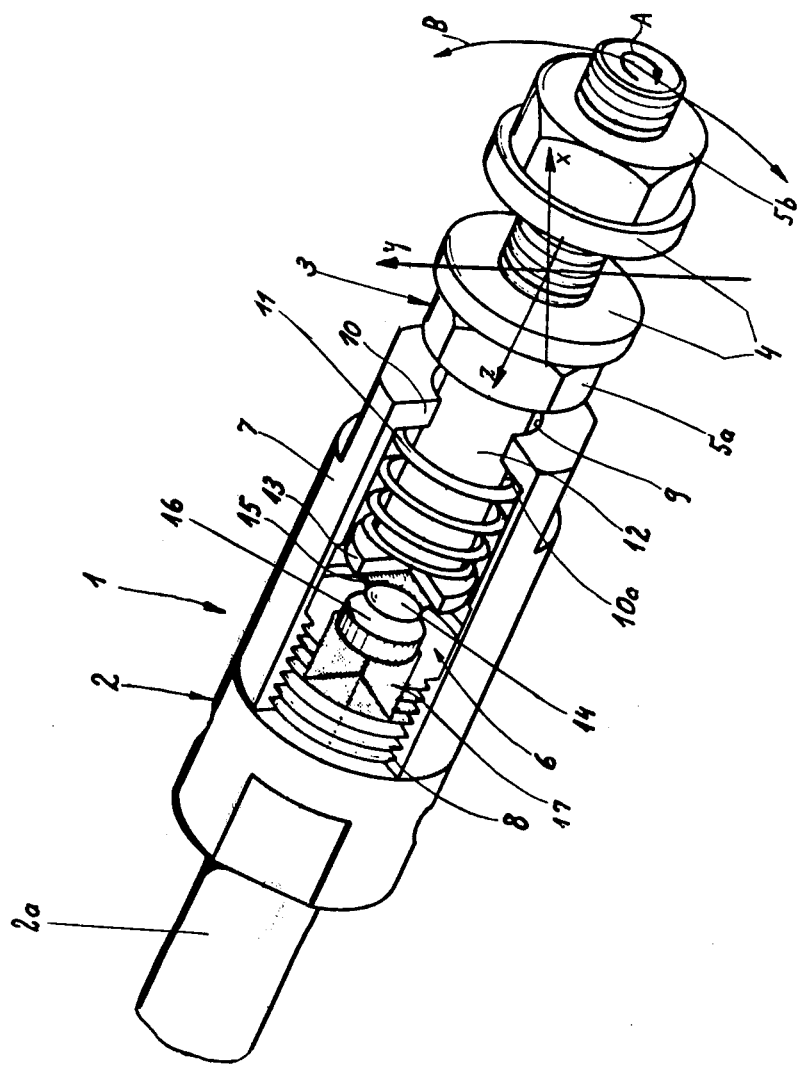
FIG. 1 is a perspective view of one embodiment of the coupling device of the present invention.

Referring now to the drawings and more particularly to FIG. 1, in one embodiment of the present invention the coupling device 1 is rod-like having a pronounced longitudinal extension. Coupling device 1, as shown in FIG. 1, is usable with a longitudinal potentiometer of small dimensions. By way of example, the potentiometer may be constructed such that an extension 2a of a first partial rod 2 of coupling device 1 serves as a pull rod of the potentiometer (not shown) which extends through the entire potentiometer body and which is for example, journaled at both ends by means of appropriate glide bearings to thus support a slider, connected in stationary manner thereto for movement over the resistance path of the potentiometer. Thus, proportional longitudinal shifts in the rod 2a result in proportionate changes in resistance. A second partial rod 3 is provided which, as noted more specifically below, is connected in absolutely play-free fashion with the first partial rod 2. The rod is free to move in all other directions so only longitudinal forces representing translatory motion can be exerted upon the first partial rod 2 which is connected with the potentiometer (i.e., in a direction which corresponds to the axial extension of the coupling device 1). At its other end, the second partial rod 3 has connecting means, preferably two discs 4 and two nuts 5a and 5b to allow direct connection of the rod to the movable machine setting element (not shown) which undergoes the translatory movement.

The first partial coupling rod 2 is provided, at its end portion facing the second partial rod, with a cylindrical recess 6 for the formation of a joint. Recess 6 can be formed by an at least partial cylindrical tube 7 which is open at both ends and which is screwed onto the first partial rod at threads 8 and which has, at the other end a central circular opening 9. Opening 9 is formed by a ring flange 10 having an inner shoulder 10a against which one end of a pre-tensioning spring 11 abuts. A rod-like extension 12 of the second partial rod extends telescopically into the recess 6 through the opening 9. At its inner end, extension 12 had an enlarged diameter disc 13 upon which the pre-tensioning spring 11 bears. Also connected to the inner extension 12, is a glide piece 14 in a holder 15. Holder 15 can be a suitable adhesive or cement capable of holding the glide piece 14 in position. Preferably, glide piece 14 is a hardened steel ball which abuts against a planar abutment or anvil 16 under the pressure of pre-tensioning spring 11.

In a preferred embodiment the abutment 16 comprises a sapphire stone which is held in an appropriate setting 17 at the end of recess 6. The diameter of extension 12 is smaller than the diameter of opening 9 by a desired amount. The second partial rod telescopically extends into the recess 6 through opening 9. Further, the diameter of the disc 13 is smaller than the recess inner diameter, by a predetermined amount. Since the pre-tensioning spring 11 is constructed as a pressure or biasing spring, it produces a completely play-free abutment of the hardened steel ball 14 at the planar face of the sapphire stone, or abutment 16 so that the ball 14 is always in contact with the abutment.

That is, the force of the pre-tensioning spring 11 holds the steel ball on the surface of the sapphire stone under any conceivably occuring frictional or accelerational influences. However, the pre-tensioning spring 11 is yieldable in a radial direction such that it has no, or only negligible, restoring forces.

The second partial rod 3 can move freely relative to the first partial rod 2. It can be subjected to limited parallel displacement in the direction of the X-Y coordinate plane, assuming the Z direction corresponds to the translatory measuring movement.

Additionally, the coupling device of the present invention permits rotary or circular movement of the second partial rod about its central axis corresponding to the arrow A as well as any tumbling planar movements along the arrows B. The second partial rod 3 is completely movable in all the aforementioned directions and, further, the second rod is loosely held with respect to the first rod and thus transmits none of the foreign forces which result from the movements to the potentiometer. That is only translational or longitudinal movement of rod 3 is communicated to the potentiometer.

Due to the respective spacings of the disc 13 and the inner wall of the tube, and of the diameter of opening 9 with respect to the diameter of extension 12 of the second partial rod, in addition to parallel movement in the X-Y direction, the two rods can perform tumbling or pivotting movements relative to one another, at least until the disc 13 and the rod extension 12 contact the surrounding walls. Such displacement of the second partial rod results in no axial position change. Axial position change during tumbling or pivotting movement is negligible because of the respective sizes of the elements, and is one measure below the measuring accuracy of the system.

Both the hardenened steel ball and the planar sapphire stone upon which the ball rides are selected to keep frictional influences as low as possible and to avoid wear.

Figure 2A:
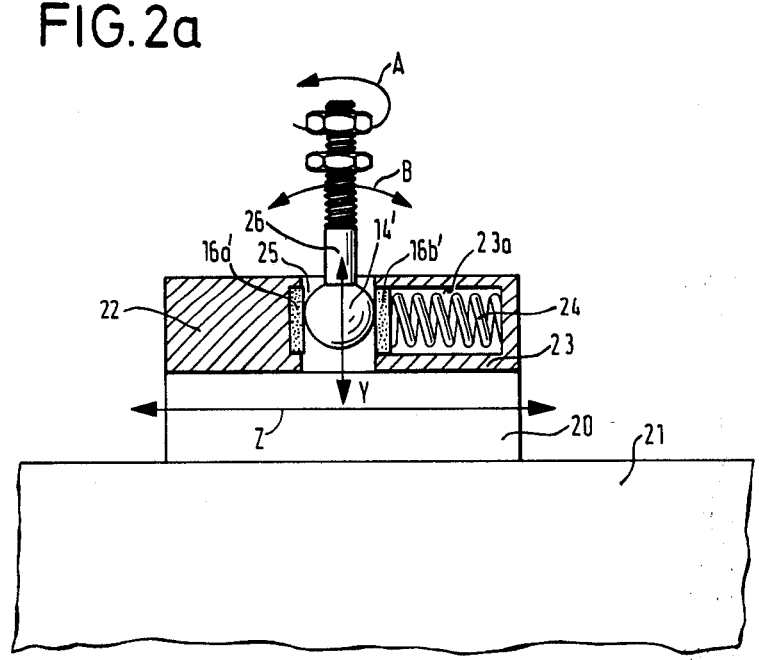
FIG. 2a is a side view of the coupling device of the present invention in use with a large, longitudinal potentiometer having an outward extending slider on which the coupling device is mounted and to which the setting member of the machine element is connected.
Figure 2B:
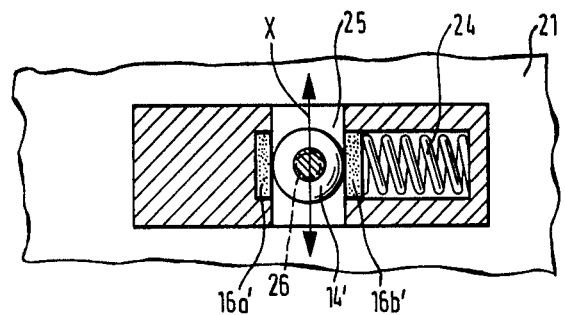
FIG. 2b is a plan view of the coupling device of the present invention in use with a large longitudinal potentiometer having an outwardly extending slider on which the coupling device is mounted and to which the setting member of the machine element is connected.

In another embodiment of the present invention, shown in FIGS. 2a and 2b, an outwardly extending slider 20 of potentiometer is provided. The slider 20 can be shifted over the entire length of the potentiometer, corresponding to the path direction to be measured. On an upper portion, the slider carries the coupling device.

The main elements of the coupling device include a ball-shape glide piece which preferably is a hardened steel ball 14' and two planar abutments located on opposite sides of the ball. Preferably the planar abutments are sapphire stones 16a' and 16b' which have their sides facing the steel ball 14' so as to provide a completely plane ground abutment face for the steel ball 14'. To insure reliable play-free holding of the steel ball between the two sapphire stones, one sapphire stone is held in a suitable holder 22 in a stationary manner, while the other sapphire stone is mounted in holder 23 so as to be longitudinally shiftable in a direction towards the steel ball.

As shown in the drawings, stone 16b' is mounted in holder 23 and is under the influence of a pre-tensioning spring 24. Holder 23 is provided with an inner bore 23a which receives pre-tensioning spring 24 and which forms a slideable bearing for sapphire stone 16b'. Sapphire stone 16b' is practically stationary in its mount, and it is essentially immobile so that a pressure force acting upon it, via the spring 24, is such that there is always a completely play-free abutment of the steel ball 14' against the two stone surfaces. The stone surfaces can be set flush into the associated wall regions of their holders to form with same a cage-like receiver space 25 for the steel ball 14' in which the steel ball can otherwise move—i.e. in turn, shift and freely perform combined movement in all conceivable directions without generating restoring forces. The ball is thus loosely held between the abutments 16a' and 16b' so that it can absorb forces related to the movements.

As shown in FIGS. 2a and 2b the measuring direction is denoted by the double-headed arrow Z, and the double-headed arrows X and Y designate the free shifting movements in the X-Y coordinate plane which the steel ball can execute within its cage 25. The ball is thus held in play-free abutment against the two sapphire stones. The double-headed arrow B of FIG. 2a denotes pivotting or tumbling movements performable by the ball and the arrow A denotes such rotary or circular movement performable by the ball. Ball 14' is loosely journaled and thus can move in the directions X, Y, B and A and can absorb these movements. Foreign forces resulting from these movements are not transmitted to the potentiometer.

In order to transmit movements resulting from the setting member of the machine element, via ball 14' to the slider 20, ball 14' has a pin 26 connected to it. Pin 26, at an upper portion thereof is provided with an outer thread onto which tensioning nuts may be threaded to secure it to the setting member of the machine element.

What is claimed is:

1. A coupling device for coupling a movable member of a machine to a movable member of a potentiometer to convert sliding movement of the movable member into proportional movement of the potentiometer comprising:
   a ball-shaped glide adapted to be attached to one of said movable members;
   a planar abutment engaging said glide and adapted to be attached to said other movable member, and
   a biasing spring means for applying pressure, in a working direction, to said glide piece to maintain said glide piece and said planar abutment in intimate contact with one another, thereby forming a joint connection for the transmission of only translational movement.

2. The coupling device of claim 1, and additionally comprising:
   a first rod adapted to be attached to said movable machine member; and
   a second rod adapted to be connected to said potentiometer; said glide piece being attached to said first rod and said planar abutment being attached to said second rod.

3. A coupling device according to claim 1, wherein there are at least two planar abutments, each of said planar abutments adapted to be attached to one of said moving members, said planar abutments positioned at opposite sides of said glide piece, said glide piece comprising a hardened steel ball, at lest one planar abutment being formed of a plane ground sapphire stone.

4. A coupling device according to claim 2 and additionally comprising a two-part connecting rod adapted to be positioned between said potentiometer and said movable machine member, said first and second rods being attachable to opposite ends of said connecting rod, said first rod being capable of telescopically receiving said second rod, and said biasing spring means arranged such that said first and second rods are pressed against one another in a direction of axial extension whereby the first rod journals, in the depth of its bore, the glide piece and the second rod receives at its rod end the planar abutment.

5. A coupling device according to claim 4 wherein the first rod includes a central recess having a reduced circular opening defined by a flange positioned on an end thereof, an extension of said second rod slidingly received in said recess and having a disc at the end thereof, said flange forming an inner shoulder, and a biasing spring between said shoulder and said disc for forcing said glide into intimate engagement with said abutment.

6. A coupling device according to claim 5 wherein said disc and said second rod maintain, relative to an inner wall of the first rod, a pre-determined distance, and wherein the diameter of the opening maintains, relative to the diameter of the extension of said second rod, a pre-determined distance, such that within boundaries of said respective pre-determined distances parallel displacement and tumbling movements of said second rod relative to said first rod are possible.

7. A coupling device according to claim 3 and additionally comprising a sliding piece of said potentiometer, and wherein said planar abutments define a space in which said glide piece is positioned, said planar abutments being planar in the axis of the working position.

8. A coupling device according to claim 7 and additionally comprising a holder in which one of said planar abutments is mountable in a stationary manner; a receiver in which said other planar abutment is mountable; and a pin connected to said glide piece for transmitting movements resulting from said movable machine element to said sliding piece; wherein said sapphire stones and wherein said planar abutments are capable, under the effect of said biasing spring means, of pressing in a direction towards said glide piece to thereby hold said glide piece in said space defined by said planar abutments such that said glide piece can perform both tumbling and circular movements.

9. A coupling device according to claim 8 wherein said holder include a skewing and wherein said sapphire stone when mounted in said holder and when under the influence of said bias spring means is held against said skewing.

* * * * *